United States Patent [19]
Keesman et al.

[11] Patent Number: 5,606,369
[45] Date of Patent: Feb. 25, 1997

[54] BUFFERING FOR DIGITAL VIDEO SIGNAL ENCODERS USING JOINT BIT-RATE CONTROL

[75] Inventors: Gerrit J. Keesman, Eindhoven, Netherlands; Samir N. Hulyalkar, White Plains, N.Y.

[73] Assignee: U.S. Philips Corporation, New York, N.Y.

[21] Appl. No.: 366,340

[22] Filed: Dec. 28, 1994

[51] Int. Cl.⁶ .............. H04N 7/12; H04N 7/24
[52] U.S. Cl. .............. 348/385; 348/387
[58] Field of Search .............. 348/385–389, 348/469, 159, 423, 714, 715, 716, 718; H04N 7/12, 7/24

[56] References Cited

U.S. PATENT DOCUMENTS

| | | | |
|---|---|---|---|
| 5,115,309 | 5/1992 | Hang | 348/388 |
| 5,319,457 | 6/1994 | Nakahashi et al. | 348/387 |
| 5,410,355 | 4/1995 | Kalczynski | 348/423 |
| 5,442,398 | 8/1995 | Koshiro | 348/395 |
| 5,461,619 | 10/1995 | Citta et al. | 370/118 |
| 5,481,297 | 1/1996 | Cash | 348/385 |

FOREIGN PATENT DOCUMENTS 0038811  3/1977  Japan ................... 348/387

*Primary Examiner*—Victor R. Kostak

[57] ABSTRACT

Video signal encoding apparatus, suitably for multiple video channels (A,B) has respective encoder stages (10,12) which encode a received video signal according to a predetermined coding scheme, such as MPEG standard, and output a variable bit-rate data stream to encoder channel buffering (16) which is combined in a single buffer (16) having a fixed physical size with separate portions assigned to each channel. Buffer management (18) varies the size of the effective buffer areas assigned to the respective channels to maintain the total effective buffer area close to but within the physical limits of the buffer, as defined by the overall sum of encoder output bit rates. The outputs of the encoder buffer are combined into a single data stream, suitably by multiplexing (28), for subsequent separation and decoding by a receiver (30 to 36).

9 Claims, 4 Drawing Sheets

BUFFERING FOR DIGITAL VIDEO SIGNAL ENCODERS USING JOINT BIT-RATE CONTROL

BACKGROUND OF THE INVENTION

The present invention relates to video signal encoding apparatus operable to encode for transmission two or more signals received on respective input channels, the apparatus comprising an encoder stage for each channel operable to encode the received video signal according to a predetermined coding scheme, as a specified number of data bits per encoded video frame and to output the signal as a data stream having a bit rate determined by the specified number; target setting means coupled to the encoder stages and arranged to set specified numbers for respective encoder stages per video frame or group of frames, such that the sum of the respective encoder stage output bit rates remains substantially constant; and respective buffer means coupled to receive the said variable bit-rate data stream from the respective encoder stages and arranged to output buffered data signals at respectively specified output bit rates.

The technique of maintaining a constant overall encoder output bit-rate, despite variations in the individual channel bit rates is known as joint bit-rate control and its use for multi-program video signal encoding has been found to be advantageous, particularly for video signals coded according to MPEG standards. A system for joint bit-rate control needs technical measures to deal with two problems, namely the bit allocation and the buffer management. To deal with bit allocation, the bit need of the programs (channel signals) is measured and the available bits are spread accordingly over the programs. In the present case however we are concerned particularly with the problem of buffer management, which itself encompasses several sub-problems. Some of the sub-problems are described in "Constraints on variable bit-rate video for ATM-networks" by Amy Reibman and Barry Haskell; in IEEE Transactions on Circuits and Systems for Video Technology, Vol 2, No. 4 December 1992 pp. 361–372. The Reibman and Haskell paper examines the constraints resulting from encoder and decoder buffering in an asynchronous transfer mode (ATM) network, in particular the additional constraints needed to prevent overflowing or underflowing of the decoder buffer when a variable bit-rate data channel links encoder and decoder. They describe a method in which the number of encoded bits for each video frame and the number of bits transmitted across the variable bit-rate channel are selected jointly; whilst this reduces the available options, it is suggested as a necessity imposed by the differing constraints imposed on the transmitted bit rate by the encoder and particularly the decoder buffer.

SUMMARY OF THE INVENTION

It is an object of the present invention to provide improved efficiency of decoder buffer operation.

It is a further object of the present invention to provide greater efficiency in encoder buffer management.

In accordance with the present invention there is provided a video signal encoding apparatus of the type set forth in the opening paragraph, wherein the respective buffer means comprise respective areas of memory in a single memory device, and by memory management means arranged to determine buffering requirements of the respective channels from the difference between the respective channel buffering input and output bit rates and to allocate memory area to the channels in a ratio determined by the respective buffering requirements.

The use of a single managed buffer memory provides significant savings in the amount of buffering required as advantage may be taken of the limitations imposed by joint bit-rate control, as will be described in greater detail hereinafter with regard to preferred embodiments of the invention. The total buffer memory area is preferably related to the sum of the encoder output bit rates whilst being lower than the product of the maximum instantaneous buffering requirements of a channel and the number of channels: as will be appreciated, such a saving is not possible where separate channel buffers are used.

To derive appropriate output bit rates for the buffered channels, means may be provided to derive the rate for a channel from the corresponding encoder stage output bit rate. A suitable derivation technique, where the buffer output is a percentage of the encoder stage output rate and the percentage is inversely related to the encoder stage output rate, is described in greater detail in our co-pending application Ser. No. (PHB 33946), the disclosure of which is incorporated herein by reference.

The target setting means, providing the joint bit-rate control, may include comparator means deriving a ratio relating the respective information contents of video image frames received on the respective channels. The specified number of bits per frame per channel would then be set by dividing the total number of bits available among the channels according to the ratio.

The present invention may be used to provide multichannel to single channel video signal encoding apparatus by the provision of means for combining the respective buffer output signals into a single data stream for subsequent separation and decoding by a receiver. The means for combining buffer outputs may suitably be a multiplexer.

The present invention also provides a receiver apparatus for use with encoder apparatus as recited above and comprising means operable to receive the said single data stream and to separate it into data streams corresponding to the separate channels encoded. Following channel selection means, a decoder buffer coupled to receive the channel data stream and to output a further data stream, and a decoder stage coupled to receive the buffer output data stream and to decode it according to the said predetermined coding scheme are preferably provided.

As will be explained below, the present invention has particular benefit where the or each channel signal is encoded in accordance with the MPEG standard.

BRIEF DESCRIPTION OF THE DRAWINGS

Preferred embodiments of the present invention will now be described, by way of example only, and with reference to the accompanying drawings in which.

DETAILED DESCRIPTION OF THE PREFERRED EMBODIMENTS

The following description is concerned with the management of MPEG-coded video signals by way of example, although it will be readily appreciated by the skilled practitioner that the invention is not restricted to such coding standards. The MPEG standard constrains bitstreams such that they may not overflow or underflow a hypothetical buffer: this hypothetical buffer can be related to the physical buffers appearing in the signal encoder and decoder stages.

In case of joint bit-rate control we want to use larger encoder buffers as will be explained in greater detail below. As an example, if we have 5 programs with an average bit-rate of 3.5 Mbit/s each, and furthermore have a maximum bit-rate of 12 Mbit/s (set by the MPEG main profile) and a minimum bit-rate of 1.5 Mbit/s, a total of 45.6 Mbit for buffering memory would be required. The problem is this amount of required memory.

In order to reduce the required amount of memory for the encoder buffers, we propose the use of a joint buffer for all program channels. This is feasible because the separate bit-rates of the respective program channels add to a constant bit-rate, and we have appreciated that this provides a relationship between the contents of each encoder channel buffer. That is to say, if one buffer is full, all other buffers will be relatively empty. This observation is explained and exploited in greater detail hereinafter.

Figure 1:
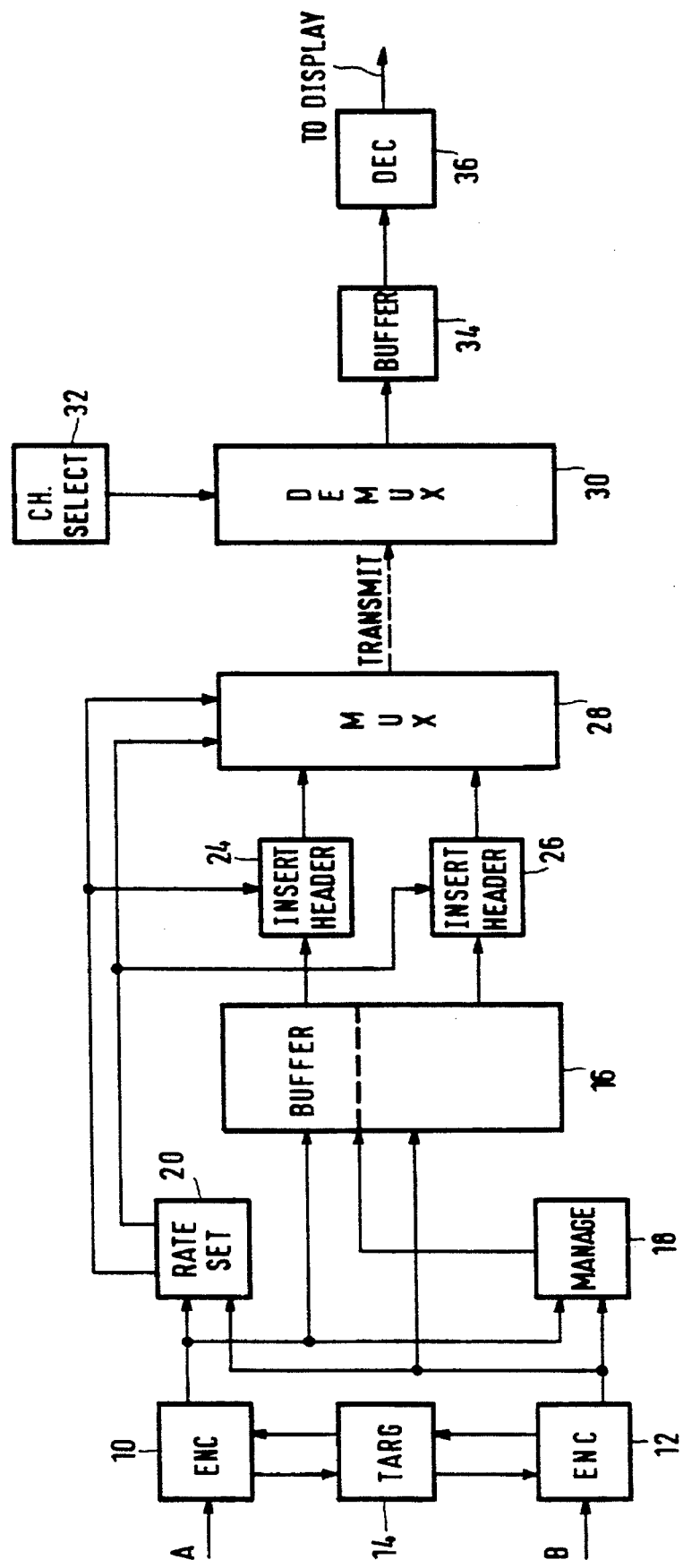
FIG. 1 is a block schematic diagram of an encoding and decoding system.

A system of encoder and decoder embodying the invention is shown in a schematic form in FIG. 1 of the drawings. To the left of FIG. 1, the encoding section is shown with a pair of input channels A and B supplying signals to respective encoders 10,12. Whilst only two channels are shown in this example, it will be readily appreciated from the following description that the present invention is applicable to systems encoding three or more channels.

Each encoder input is also supplied to a target setting unit 14 which assigns global targets to individual video frames specifying the number of bits that the encoder must use in compressing the frame. The computation of these targets, by a technique using the pictures global complexity, relates the relative information densities of frames at the respective encoders to factors such as the encoding scheme used: for instance, with coding according to MPEG standards, the global complexity will take account of whether a frame is to be encoded as an I-, P- or B-picture. The outcome of the technique is that, whilst the outputs of the two encoders 10,12 will be variable bit-rate streams, as explained previously the sum of these bit rates remains constant over time.

The outputs of the encoders 10,12 are written into respective areas of a buffer memory 16 under control of a memory management unit 18 which allocates the memory as required between the channels. The encoder outputs are also passed to a calculation stage 20 which may, in practice, be combined into a single calculation unit with the memory management unit 18. The calculation unit 20 derives values for the respective channel output bit rates from the buffer 16, such that the sum of these bit rates remains constant, and supplies these to header insertion stages 24,26 which read the respective signals out of the buffer at the selected rate. Finally, these buffered channel signals from the header stages 24,26 are combined to a single bit-stream by suitable means such as a multiplexer 28 which also receives the channel bit rate signals from calculation unit 20. On the basis of the bit rates, the multiplexer 28 determines the selection (in terms of time and number of packets) of packets from the channels, such that the programmes are packed together according to the MPEG standard ISO 13818-1.

Following transmission (in the case of satellite television) and/or distribution (in the case of cable television) of the multiplexed signal, the signal is passed to a demultiplexer 30 at which the channels A and B are separated. In general, at the receiver end, only a single channel will be required at any one time and accordingly, under control of an external selection 32, the demultiplexer 30 is set to inhibit output by all but the selected channel from those separated. The demultiplexer output is then buffered 34 and decoded 36 to provide a video signal for display.

Figure 2:
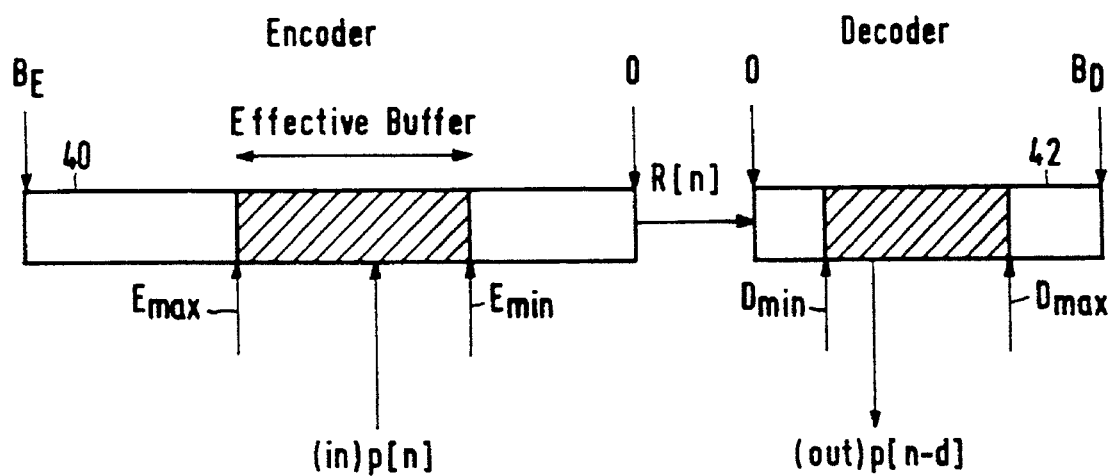
FIG. 2 represents usage of encoder and decoder buffers for one channel of the system of FIG. 1.

From the foregoing it can be seen that, for each program channel, we have a section of the encoder buffer outputting a variable bit-rate and a decoder buffer. In order to further explain the buffer management technique of the present invention we shall use the model shown in FIG. 2 which shows a section of the encoder buffer 40 and the decoder buffer 42 for one channel and at an arbitrary time n. The encoder buffer section 40 has a physical size $B_E$ but usage is confined in the following model to an effective size (shown shaded) delimited by $E_{max}$ and $E_{min}$. Correspondingly, decoder buffer 42 has a physical size $B_D$ and an effective size delimited by $D_{max}$ and $D_{min}$. For the sake of clarity, the intervening multiplexing, transmission and demultiplexing stages are omitted from the Figure.

Assuming that the encoder writes a compressed picture into the encoder buffer at regular intervals (for instance each 40 ms), with each interval corresponding to a time n, in this model we use the following variables:

p(n) is the number of bits in the picture at time n

R(n) is the current bit transmission rate at time n

The contents of the encoder buffer E(n) have the limits $E_{max}$ and $E_{min}$

The contents of the decoder buffer D(n) have the limits $D_{max}$ and $D_{min}$

The maximum values of $D_{max}$ and $D_{min}$ are limited by the MPEG profile in use. Whilst it is very common to assume $D_{min}=E_{min}=0$ (as is the case with the consideration of ATM network analysis in the Reibman and Haskell paper mentioned above) we have however found that this is too restricting a choice, as will be explained below.

We assume that the buffers behave as follows $$E(n)=E(n-1)-R(n)+p(n) \qquad \text{(Equation 1)}$$

$$D(n)=D(n-1)+R(n)-p(n-d)$$

This means that in the encoder buffer we write a new picture each time n and that this picture is extracted from the decoder buffer d samples later, where d is the system delay of the complete encoder/decoder system.

For simplicity of notation we shall restrict ourselves to "pseudo static behaviour". This means assuming that the bit rate is constant over d+1 or more time periods. We can derive the relations between the buffer limits to be $$E_{max}=(d+1).R-D_{min} \qquad \text{(Equation 2)}$$

$$E_{min}=(d+1).R-D_{max}$$

Exploring some of the consequences of Equation 1, and in order to further illustrate the prior art problem, we shall select the common choice $D_{min}=E_{min}=0$. A relation for the delay may be found by using the substituted form of Equation 1, which gives $$0=(d+1).R-D_{max} \qquad \text{(Equation 3)}$$

It is important to realize that it is not appropriate to change the delay of the entire system because this would result in a discontinuity in display. Accordingly, for all possible bit rates, we have the same system delay d. It will be seen that the largest effective decoder buffer size is given if the bit rate is largest. Since the maximum buffer size is limited by the MPEG profiles, the delay may be calculated from the maximum effective decoder buffer size and the maximum bit rate. Thus the delay can be calculated from Equation 4 below:

$$d = \left( \frac{max(D_{max})}{R_{max}} - 1 \right) \quad \text{(Equation 4)}$$

For this example and for a delay of d=7 we find the following values for the buffer limits as functions of the bit rate, as shown in Table 1.

TABLE 1

| Bit rate | $E_{max}$ | $D_{max}$ |
|---|---|---|
| 1.5 Mb/s | 0.24 Mb | 0.24 Mb |
| 3.5 Mb/s | 0.56 Mb | 0.56 Mb |
| 7 Mb/s | 1.12 Mb | 1.12 Mb |

It will be noted that for low bit rates the available effective buffer space is strongly limited. This is unwanted as it implies constraints on the video compression which may lead to lower image quality.

In order to circumvent the above problem we propose selecting $D_{min}=0$ and $D_{max}=1.12$ Mb for the decoder buffer, such that we always have the same effective decoder buffer. Substituting this in Equation 1 yields $$E_{min}=(d+1).R-D_{max} \quad \text{(Equation 5)}$$

In this particular case the under limit for the encoder buffer $E_{min}$ is varying and unequal to zero, which implies that a part of the encoder buffer is idle. Conceptually this idle encoder buffer part can be interpreted as follows. We require a certain buffer space to buffer bit rate variations. In the first example ($D_{min}=E_{min}=0$) the buffering capacity for channel bit rate variations was split over the encoder and the decoder buffers. In the latter example, this buffering capacity is fully assigned to the encoder buffer. Thus, the delay of the complete system can now be calculated from $$d = \left( \frac{D_{max}}{R_{min}} - 1 \right) \quad \text{(Equation 6)}$$

Equation 6 is based on the recognition that at the minimum bit rate the value $E_{min}$ must still be greater than or equal to zero, whilst there are no restrictions on the maximum encoder buffer size by Equation 5.

With $D_{max}=1.12$ Mb and $D_{min}=0$, for this particular example we find the relation between bit rate and buffer limits to be as shown in Table 2.

TABLE 2

| Bit rate | $E_{min}$ | $D_{min}$ |
|---|---|---|
| 1.5 Mb/s | 0.02 Mb | 1.14 Mb |
| 3.5 Mb/s | 1.54 Mb | 2.66 Mb |
| 7 Mb/s | 3.44 Mb | 4.56 Mb |

It will be noted that the under limit of the encoder buffer is now non-zero whilst a larger encoder buffer is required compared with the previous example.

Figure 3:
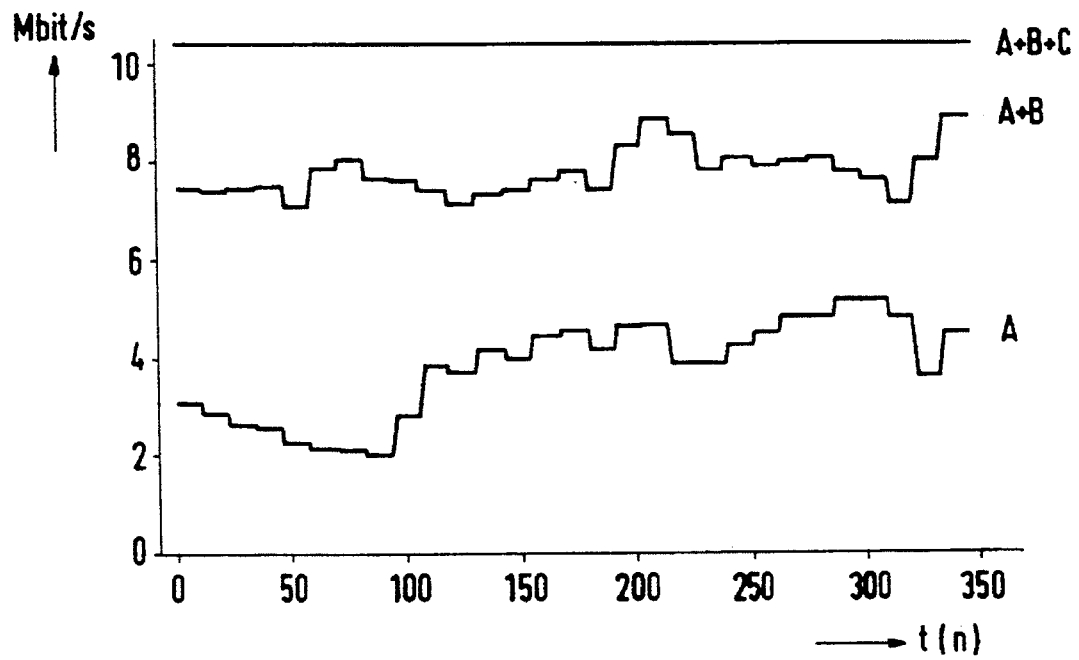
FIG. 3 represents the bit rates of three programs encoded with joint bit-rate control.

The latter example is now further illustrated with reference to the results of a simulation. In FIG. 3 the bit rates of three programs A, B, and C are shown encoded with joint bit-rate control over a number of the frame periods n, and with the lowest trace representing the bit rate of A, the middle trace the sum of the bit rates of A and B, and the upper (flat) trace the total of all three channel bit rates. Each program had an average bit rate of 3.5 Mbit/s available, and hence the sum of the 3 bit rates equals 10.5 Mbit/s, as shown by the top trace.

Figure 4:
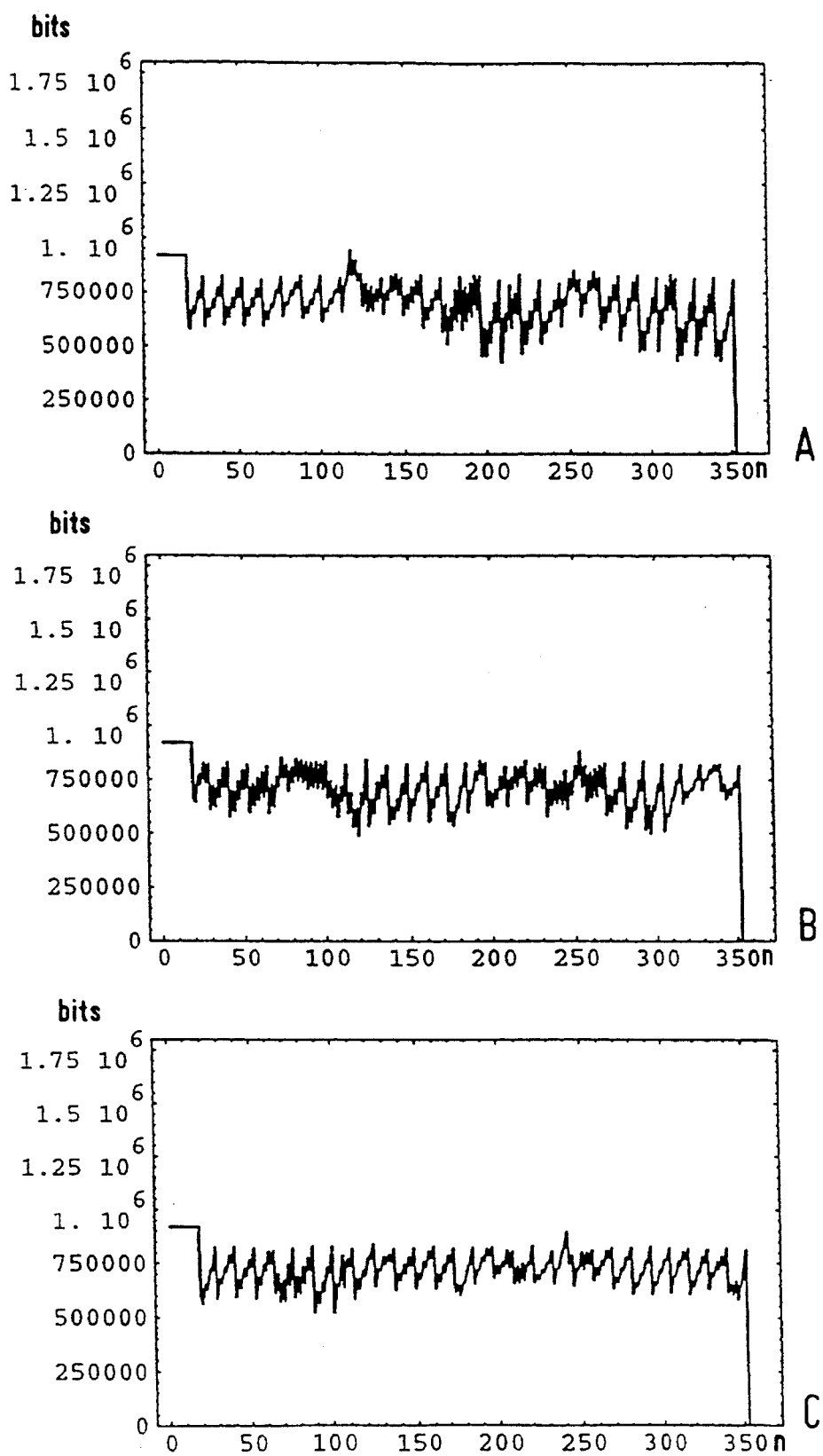
FIGS. 4 and 5 respectively represent the contents of the three decoder buffers and the three encoder buffers for the encoded programs of FIG. 3.
Figure 5:
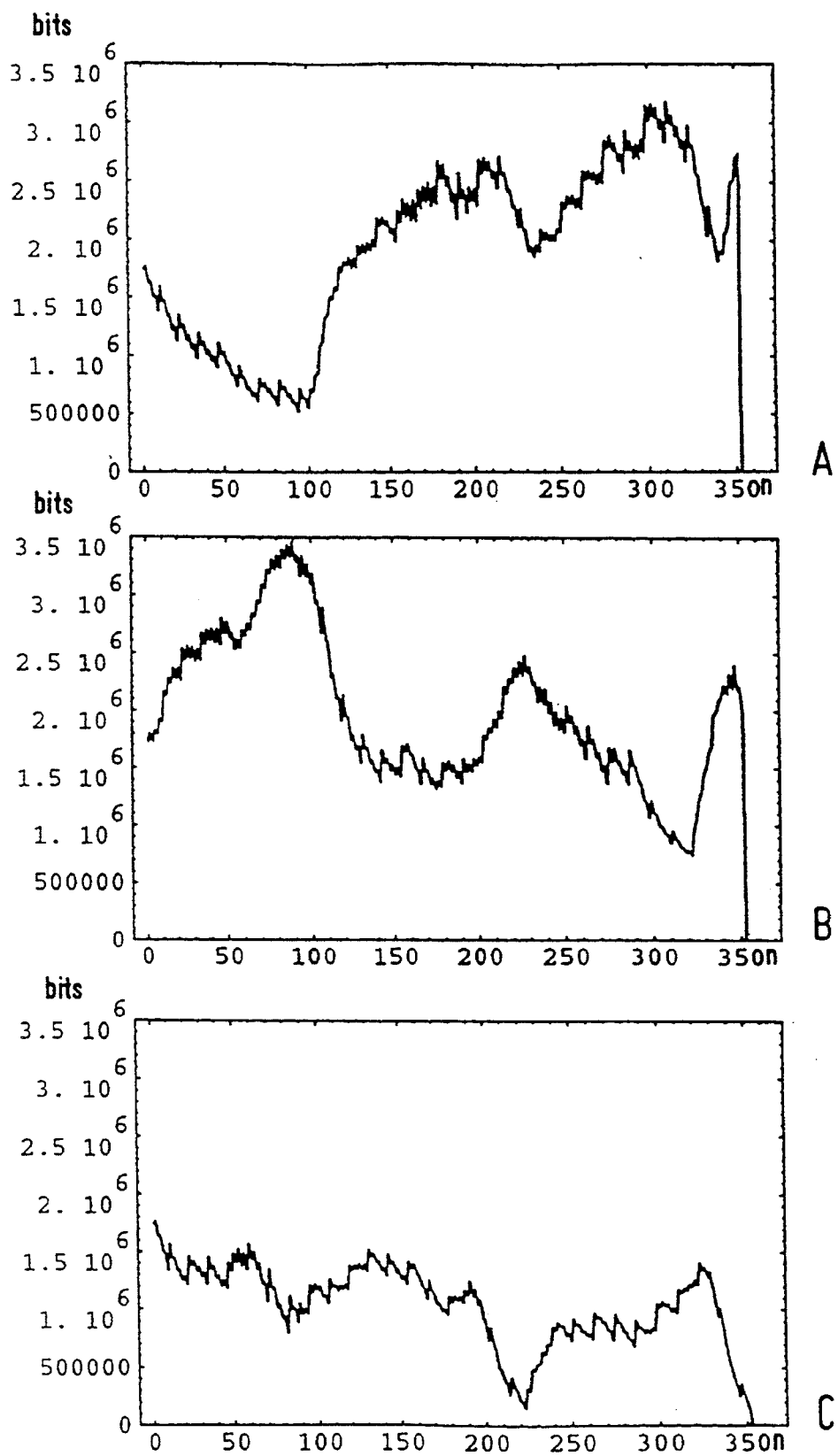

The bit rate profiles of FIG. 3 were used to obtain the decoder and encoder buffer contents shown for each of program channels A, B, and C in FIGS. 4 and 5 respectively. The decoder buffer contents shown for the three channels may be considered as alternatives where, as mentioned above, only one channel is buffered for decoding. It will be noted that the encoder buffer section contents in FIG. 5 have variations due to bit rate variations in the video bit stream, i.e. I, P and B-pictures, and variations due to the channel bit rate. The last components are global variations. It will also be noted that there is a relation between the global (i.e. overall) encoder buffer filling and the filling of the individual encoder buffers as indicated previously.

Using the buffering technique proposed above in the second example (which is proposed with joint bit-rate control) then the following amount of memory is needed for the buffers:

$$N.\max (E_{max})=N.(d+1).R_{max}=45.6 \text{ Mbit} \quad \text{(Equation 7)}$$

where N denotes the number of programs combined in encoding. For a maximum bit rate of 12 Mbit/s second and 5 programs we require a total of 45.6 Mbit of memory. This, as will be appreciated, is a considerable amount of memory. However, as previously discussed, by utilising the fact that the selected bit rates sum up to a constant bit rate such that all of this memory is not required at the same time, we can give $$\Sigma E_{max}=(d+1).N.\bar{R}=12.6 \text{ Mbit} \quad \text{(Equation 8)}$$

Equation 8 shows that the upper limits of all of the encoder buffer sections sum up to a constant value which denotes the required amount of encoder buffer memory. From this it is clear that a significant saving has resulted from using a joint buffer.

From reading of the present disclosure, other modifications will be apparent to persons skilled in the art. For example, in the encoder stage of FIG. 1, where the buffer 16 itself includes the capability for placing stored data at its outputs at controlled rates, the header insertion stages 24,26 may be replaced by direct paths to the multiplexer 28 and the channel rate signals from calculation unit 20 would instead be supplied to the buffer 16 to set the read-out rates.

Other such modifications may involve other features which are already known in the design, manufacture and use of digital signal encoding and decoding systems, devices and component parts thereof and which may be used instead of or in addition to features already described herein. Although claims have been formulated in this application to particular combinations of features, it should be understood that the scope of the disclosure of the present application also includes any novel feature or combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Video signal encoding apparatus operable to encode for transmission two or more signals received on respective input channels, the apparatus comprising:

an encoder stage for each channel operable to encode the received video signal according to a predetermined coding scheme, as a specified number of data bits per encoded video frame and to output the signal as a data stream having a bit rate determined by the specified number;

target setting means coupled to the encoder stages and arranged to set specified numbers for respective encoder stages per video frame or group of frames, such that the sum of the respective encoder stage output bit rates remains substantially constant; and respective buffer means coupled to receive the said variable bit-rate data stream from the respective encoder stages and arranged to output buffered data signals at respectively specified output bit rates;

characterised in that the respective buffer means comprise respective areas of memory in a single memory device, and by memory management means arranged to determine buffering requirements of the respective channels from the difference between the respective channel buffering input and output bit rates and to allocate memory area to the channels in a ratio determined by the respective buffering requirements.

2. Apparatus as claimed in claim 1, wherein the total memory area is related to the sum of the respective encoder stage output bit rates and is less than product of the maximum instantaneous buffering requirement of a channel and the number of channels.

3. Apparatus as claimed in claim 1, further comprising buffering output bit rate deriving means coupled to receive an encoder stage output signal and operable to determine the bit rate thereof, to calculate a further bit rate as a percentage thereof which percentage is inversely related to the encoder stage output bit rate, and to control the respective channel buffering output bit rate at the further bit rate.

4. Apparatus according to claim 1, wherein the target setting means is coupled to receive the input video signals of the respective input channels and includes comparator means operable to derive a ratio relating the respective information contents of video image frames received on the respective channels, and to set the specified numbers as fractions of a predetermined total number of bits according to the ratio.

5. Apparatus as claimed in claim 1, further comprising means for combining the respective buffer output signals into a single data stream for subsequent transmission.

6. Apparatus as claimed in claim 5, wherein the means for combining buffer outputs is a multiplexer.

7. A receiver apparatus for use with apparatus as claimed in claim 5, comprising:

means operable to receive the said single data stream and to separate it into data streams corresponding to the separate channels encoded;

channel selector means operable to select and output one of the said data streams in response to user input;

a decoder buffer coupled to receive the selected data stream and to output a further data stream; and a decoder stage coupled to receive the buffer output data stream and to decode it according to the said predetermined coding scheme.

8. Apparatus as claimed in claim 1, wherein the or each channel signal is encoded in accordance with the MPEG standard.

9. Apparatus as claimed in claim 8, wherein two or more channel signals are encoded and combined in accordance with the MPEG standard.

* * * * *